United States Patent [19]

Lewis

[11] 3,970,329
[45] July 20, 1976

[54] INFLATABLE BAND RESTRAINT STITCHING

[75] Inventor: Donald Joseph Lewis, Troy, Mich.

[73] Assignee: Allied Chemical Corporation, Morris Township, N.J.

[22] Filed: Nov. 26, 1974

[21] Appl. No.: 527,324

Related U.S. Application Data

[63] Continuation of Ser. No. 322,593, Jan. 10, 1973, abandoned.

[52] U.S. Cl. .............................. 280/733; 280/744
[51] Int. Cl.² ................................... B60R 21/10
[58] Field of Search ............ 280/150 AB, 150 SB; 244/151 R; 9/340; 112/314

[56] References Cited
UNITED STATES PATENTS

| | | | |
|---|---|---|---|
| 278,432 | 5/1883 | Hoeflich | 9/340 |
| 2,043,538 | 6/1936 | Hardie | 112/414 |
| 2,401,132 | 5/1946 | Boecker | 112/414 |
| 3,154,272 | 10/1964 | Gold | 244/151 R |
| 3,430,979 | 3/1969 | Terry et al. | 280/150 AB |
| 3,682,498 | 8/1972 | Rutzki | 280/150 AB |
| 3,801,156 | 4/1974 | Granig | 280/150 AB |

FOREIGN PATENTS OR APPLICATIONS

| | | | |
|---|---|---|---|
| 238,577 | 2/1965 | Austria | 280/150 SB |
| 1,234,536 | 2/1967 | Germany | 280/150 SB |

*Primary Examiner*—Kenneth H. Betts
*Attorney, Agent, or Firm*—Patrick L. Henry; Ernest D. Buff

[57] ABSTRACT

An inflatable band restraint for vehicle safety systems secured to the terminal webbing with longitudinal stitching such as a zig-zag stitch capable of yielding in at least two dimensions when the belt is inflated to prevent failure of the stitching.

1 Claim, 2 Drawing Figures

INFLATABLE BAND RESTRAINT STITCHING

This is a continuation of application Ser. No. 322,593, filed Jan. 10, 1973, now abandoned.

FIELD OF THE INVENTION

This invention relates to safety devices for vehicle occupants, more particularly to inflatable band restraint safety devices.

DESCRIPTION OF THE PRIOR ART

Seat belt devices to secure vehicular occupants in their seats in general use today usually include two sections of seat belt webbing, each of which has one end mounted to the vehicle with the other ends attached to a buckle and a cooperating tongue. Such seat belts are designed to restrain an occupant in his seat during a collision by limiting the forward motion of the occupant with respect to his seat as a result of the collision. That is, the wearer moves forward and impacts against the seat belt webbing which thereafter restrains him against further forward motion.

Safety devices of the air bag type have been proposed in which an inflatable air bag is mounted in the interior of the vehicle and is inflated in response to a sensing device which is actuated by a collision of the vehicle. Air bags are designed to prevent the occupant from striking the vehicle structure and operate by cushioning the forward motion of the occupant during a collision.

It has been proposed to combine the two types of safety devices mentioned above, as, for example, in U.S. Pat. No. 3,682,498 to Rutzki, and my copending application Ser. No. 290,917 entitled "Vehicle Safety System" filed on Sept. 21, 1972, now Pat. No. 3,841,654 which application is hereby incorporated herein as reference.

It has been found, however, that the conventional box stitch used to secure most seat belt webbing is not satisfactory to secure the inflatable portion of an inflatable restraint to the terminal webbing. Such box stitch has a tendency to fail due to the stress exerted outwardly as well as along the longitudinal axis of the terminal webbing at the point where they are stitched to the inflatable portion.

SUMMARY OF THE INVENTION

In accordance with this invention, it has been found that this tendency to fail can be markedly reduced by providing an improved vehicle safety system comprising an inflatable restraining means having at least one end portion and an inflatable section attached to said end portion, said inflatable section being secured to said end portion by longitudinally extendible stitching extending generally in the same direction as the longitudinal axis of the inflatable section and capable of withstanding significant stress in at least two dimensions.

More particularly, this invention relates to an inflatable band restraint comprising an elongated inflatable portion secured at either end to webbing by a series of longitudinal zig-zag stitches capable of withstanding significant stress in at least two dimensions.

DESCRIPTION OF THE PREFERRED EMBODIMENT

Figure 1:
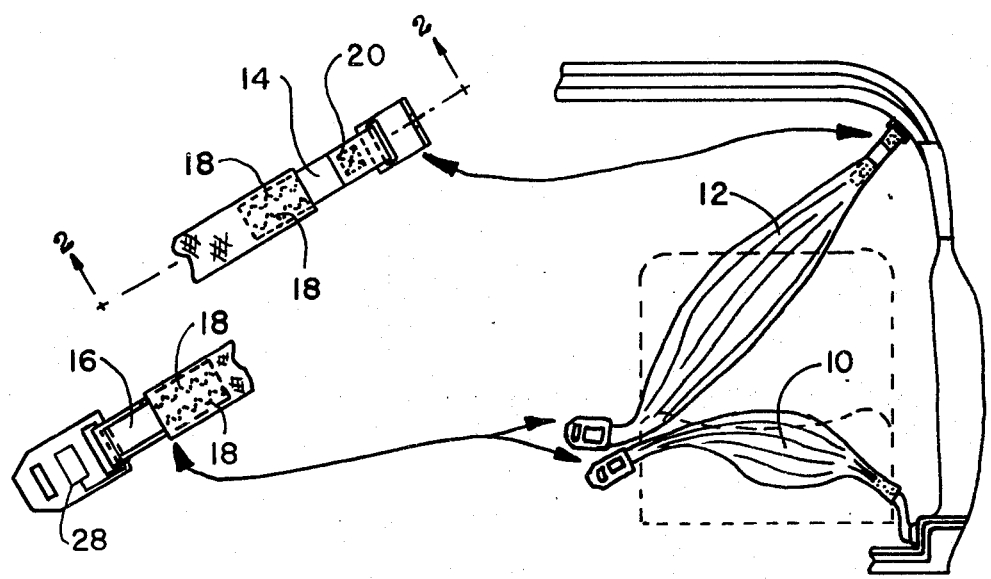
FIG. 1 is a prospective view of my invention showing the preferred stitching used to secure the inflatable portion to the webbing.

In accordance with a preferred embodiment of this invention, an inflatable band restraint safety device 10 is provided for vehicle occupants which comprises hollow portion 12 which is adapted to be inflated prior to any substantial forward motion of the wearer with respect to his seat as a result of a collision of the vehicle or other predetermined condition which is sensed by a sensing means.

The term "vehicle" as used herein refers to conveyances for carrying people such as automobiles, aircraft and the like.

Referring to the drawings wherein some reference numerals refer to the same or like parts, an inflatable band restraining means 10 includes inflatable section 12 connected to terminal webbing sections 14, 16.

Inflatable section 12 is preferably formed of a generally tubular sleeve and is normally rolled, folded or otherwise maintained in the uninflated position. Preferably, the band 10 is folded to provide a seemingly flat section, and the folds are maintained in the tube by suitable fastening means such as frangible stitches or the like.

Inflatable section 12 is preferably formed of a tubular configuration which is cut to the desired length to provide a unitary structure having continuous inner and outer walls. Alternatively, it may be formed from a plurality of flat lengths which are connected to each other along their longitudinal edges directly by means of stitching, slips, adhesive or other fastening means or indirectly by means of an intermediate strip of material suitably attached to each flat fabric by similar fastening means. However, a unitary section of tubular fabric is preferred because of its high strength.

Although it is preferred to form the section 12 from a tube of fabric, it may alternatively be formed from high strength plastic or rubber materials by such processes as extrusion, etc., such as tubular stock of nylon, polyester, polyethylene, polypropylene, or other plastics or rubber.

It is desired in one prefered embodiment that expandable section 10 be substantially of low porosity, that is, having relatively low gas permeability, so that when inflated with a gas it retains its inflated state by substantially preventing escape of the gas. For this purpose, inflatable section 12 is preferably woven tightly and is coated or otherwise provided with a semi-porous coating. Any conventional non-porous coating composition may be utilized for this purpose such as polyurethanes, rubbers, etc., and the quantities utilized depend upon the type of fabric to be coated, the coating composition as well as other factors which are apparent to those skilled in the art. In certain instances, it may be desired to provide section 12 with a desired degree of porosity such as by eliminating the impervious coating or providing apertures in the material.

The expandable section 12 of band 10 is attached to conventional seat belt webbing 14, 16 at either end and this webbing is in turn secured to a retractor by a buckle tongue, clasp or the like for securing the band around the occupant to the car.

Figure 2:
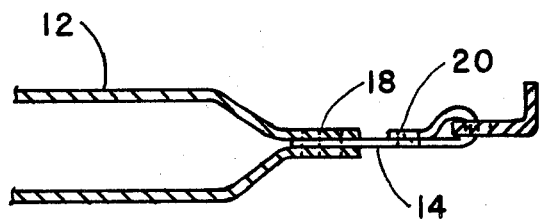
FIG. 2 is a section taken on lines 2—2 of FIG. 1 showing the forces acting on the stitching securing the inflatable portion to the terminal webbing.

Referring to FIGS. 1 and 2, an inflatable restraining band 10 is provided wherein the inflatable section 12 is secured to terminal webbing 14, 16 by a series of longitudinal zig-zag stitching 18 extending through three layers of material, namely, the terminal webbing 14 and the material on either side thereof (comprising the inflatable section which surrounds the terminal webbing 14,16.)

The inflating mechanism 28 may be located at the buckle tongue as shown generally in FIG. 1, but not in the detail of the tongue of FIG. 1, and connected to the inflatable band interior 12 by conventional means. Alternatively, the inflating mechanism may be in communication with inflatable portion 12 adjacent the terminal webbing 14,16.

Inasmuch as buckles and retractors are well known in the art and may be of a variety of designs, they are not specifically described herein.

Inflating means 28 is selected to inflate the inflatable band in a very short time after actuation thereof by a sensing means, by introducing gas into the inflatable section 12.

Examples of suitable sensing devices are those shown in U.S. Pat. No. 3,668,063 to Bell. As stated above, such sensing means are responsive to a condition of the vehicle, most preferably a collision thereof, rather than being responsive to the movement of the wearer into the restraint. As a result, the vehicle safety system thereof is capable of restraining the wearer prior to his moving with respect to his seat as a result of a collision.

The inflating means 28 includes a gas source which may be of the gas generating type (activated by means of a pyrotechnic device, for example) or stored gas type or a combination of both. As these gas sources also are known in the art, particularly with respect to proposed air bag restraint systems, they are not specifically described herein.

As inflatable section 12 is inflated, it expands radially to its enlarged diameter while at the same time it is contracting longitudinally. The longitudinal contraction occurs because a portion of the section 12 is being expanded radially to form the inflated tube. This contraction acts against the wearer and presses him against the seat. The expanding force of the inflating band restraint also serves to press the wearer rearwardly into his seat.

This expansion puts a two-dimensional strain on the stitching 18 which secures the inflatable portion 12 to the terminal webbing 14,16 as shown in FIG. 2. Surprisingly, it has been found that when these two pieces are secured together with zig-zag stitching 18 extending in the longitudinal direction of the restraint, such stitching is capable of withstanding this two-dimensional stress due to its ability to yield slightly in at least two directions. The conventional box stitch 20 used to secure the terminal portions of most seat belts, on the other hand, has a tendency to fail when subjected to this two-dimensional stress as opposed to the one dimensional stress normally imposed on the conventional seat belt.

At least two, preferably at least four to five rows of zig-zag stitching 18 are used to secure the inflatable portion to each terminal webbing 14,16, and each row preferably extends a distance ("d") of at least two inches in the longitudinal direction with a stitch width of ⅛ inch to ½ inch.

While exemplary embodiments of the invention have been described, the true scope of the invention is to be determined from the following claims.

I claim:

1. A vehicle safety system comprising an inflatable band restraint having an inflatable section with a longitudinal axis, said inflatable section being folded in an uninflated state and adapted to be positioned about a wearer when the wearer is seated in a seat within the vehicle; inflating means capable of inflating said inflatable section in response to a preselected condition of the vehicle; webbing for securing at least one end of said inflatable band restraint to said vehicle, zig-zag stitching joining said webbing to said inflatable band restraint, said stitching comprising at least two rows of zig-zag stitches, each of said rows longitudinally extending and longitudinally extendible in the same direction as the longitudinal axis of the inflatable section for a distance of at least two inches, whereby said stitching is capable of withstanding significant stress in at least two directions on inflatation.

* * * * *